US012598465B2

(12) United States Patent
Golti et al.

(10) Patent No.: US 12,598,465 B2
(45) Date of Patent: Apr. 7, 2026

(54) WI-FI DEAUTHENTICATION ATTACK DETECTION AND PREVENTION

(71) Applicant: QUALCOMM Incorporated, San Diego, CA (US)

(72) Inventors: Santhi Swaroop Golti, Hyderabad (IN); Vamsi Krishna Naidu, Hyderabad (IN); Sudhanshu Singh, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 18/069,967

(22) Filed: Dec. 21, 2022

(65) Prior Publication Data

US 2024/0214811 A1 Jun. 27, 2024

(51) Int. Cl.
 *H04W 12/122* (2021.01)
 *H04W 12/08* (2021.01)
 *H04W 12/73* (2021.01)
 *H04W 84/12* (2009.01)

(52) U.S. Cl.
 CPC ......... *H04W 12/122* (2021.01); *H04W 12/08* (2013.01); *H04W 12/73* (2021.01); *H04W 84/12* (2013.01)

(58) Field of Classification Search
 CPC ... H04W 12/122; H04W 12/08; H04W 12/73; H04W 12/79; H04W 12/06; H04W 12/12; H04W 84/12; H04L 63/1466
 See application file for complete search history.

(56) References Cited

U.S. PATENT DOCUMENTS

| | | | | |
|---|---|---|---|---|
| 5,477,225 | A | * 12/1995 | Young | G01S 13/765 342/40 |
| 10,462,672 | B1 * | 10/2019 | Sundaram | H04W 12/122 |
| 10,966,277 | B1 * | 3/2021 | Shukla | H04W 12/12 |
| 10,979,906 | B2 | 4/2021 | Nandha et al. | |

(Continued)

FOREIGN PATENT DOCUMENTS

| | | | | |
|---|---|---|---|---|
| CN | 101075899 | A | * 11/2007 | |
| CN | 109151827 | B | * 4/2021 | H04W 12/12 |
| WO | 2018190954 | A1 | 10/2018 | |

OTHER PUBLICATIONS

International Search Report and Written Opinion—PCT/US2023/082381—ISA/EPO—Apr. 3, 2024.

*Primary Examiner* — Lynn D Feild
*Assistant Examiner* — Abdullah Almamun
(74) *Attorney, Agent, or Firm* — Polsinelli LLP

(57) ABSTRACT

Systems and techniques are provided for wireless communications. For example, a network device can receive an unprotected management frame indicative of a disconnection of the network device. The unprotected management frame includes an address indicative of an identified wireless access point (AP) associated with the disconnection. The network device can determine a transmitter signature associated with the unprotected management frame. The network device can determine a difference between the transmitter signature and a corresponding transmitter signature associated with a protected data frame received from the identified wireless AP. The network device can further determine, based on the difference being greater than a threshold, the unprotected management frame is not transmitted by the identified wireless AP.

26 Claims, 5 Drawing Sheets

(56) References Cited

U.S. PATENT DOCUMENTS

| | | | | |
|---|---|---|---|---|
| 11,677,423 B1 * | 6/2023 | Rahman | H04B 17/345 | 455/114.3 |
| 2005/0141498 A1 * | 6/2005 | Cam Winget | H04W 12/12 | 370/389 |
| 2007/0189245 A1 * | 8/2007 | Tang | H04W 12/125 | 370/338 |
| 2007/0192832 A1 * | 8/2007 | Qi | H04W 12/106 | 726/3 |
| 2007/0218875 A1 * | 9/2007 | Calhoun | H04L 63/126 | 455/411 |
| 2008/0252522 A1 * | 10/2008 | Asbridge | H01Q 21/08 | 343/893 |
| 2008/0295144 A1 * | 11/2008 | Cam-Winget | H04W 12/106 | 726/1 |
| 2010/0100930 A1 | 4/2010 | King | | |
| 2011/0176434 A1 * | 7/2011 | Pandey | H04W 48/16 | 370/252 |
| 2015/0012971 A1 * | 1/2015 | Ram | H04W 12/082 | 726/3 |
| 2015/0304280 A1 | 10/2015 | Marshall et al. | | |
| 2016/0029384 A1 * | 1/2016 | Sidhu | H04W 72/0453 | 370/329 |
| 2016/0165651 A1 * | 6/2016 | Pathuri | H04W 8/26 | 370/329 |
| 2016/0262122 A1 * | 9/2016 | Aldana | H04W 24/10 | |
| 2017/0244732 A1 * | 8/2017 | Manjunath | H04L 63/1416 | |
| 2018/0227176 A1 * | 8/2018 | Ponnuswamy | H04L 41/142 | |
| 2018/0295519 A1 * | 10/2018 | Nandha Premnath | H04L 63/1425 | |
| 2022/0030026 A1 * | 1/2022 | Sathe | H04L 63/1458 | |
| 2023/0007487 A1 | 1/2023 | Jain | H04W 12/122 | |
| 2023/0239139 A1 * | 7/2023 | Huang | H04L 9/0833 | 713/171 |
| 2023/0379702 A1 * | 11/2023 | Alemdar | H04W 12/06 | |

* cited by examiner

400

Receive An Unprotected Management Frame Indicative Of A Disconnection Of A Wireless Communication Device, Wherein The Unprotected Management Frame Includes A Media Access Control (MAC) Address Indicative Of An Identified Wireless Access Point (AP) Associated With The Disconnection
402

Determine A Transmitter Signature Associated With The Unprotected Management Frame
404

Determine A Difference Between The Transmitter Signature And A Corresponding Transmitter Signature Associated With A Protected Data Frame Received From The Identified Wireless AP
406

Determine, Based On The Difference Being Greater Than A Threshold, The Unprotected Management Frame Was Not Transmitted By The Identified Wireless AP
408

FIG. 4

WI-FI DEAUTHENTICATION ATTACK DETECTION AND PREVENTION

FIELD

The present disclosure generally relates to wireless communications. For example, aspects of the present disclosure are related to Wi-Fi deauthentication attacks.

BACKGROUND

Wireless communications systems are deployed to provide various telecommunication services, including telephony, video, data, messaging, broadcasts, among others. These systems may be multiple-access systems capable of supporting communication with multiple users by sharing the available system resources (e.g., such as time, frequency, and power). Multiple-access systems can be based on code division multiple access (CDMA), frequency division multiple access (FDMA), time division multiple access (TDMA), and orthogonal frequency division multiple access (OFDMA), etc.

A wireless network, for example a wireless local area network (WLAN), such as a Wi-Fi (e.g., Institute of Electrical and Electronics Engineers (IEEE) 802.11) network may include one or more access points (APs) that may communicate with one or more stations (STAs) or mobile devices. The one or more APs may provide a shared wireless communication medium for use by multiple STAs. An AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink (DL) and uplink (UL). The DL (or forward link) may refer to the communication link from the AP to the station, and the UL (or reverse link) may refer to the communication link from the station to the AP.

BRIEF SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one illustrative example, an apparatus for wireless communications is provided. The apparatus includes at least one memory and at least one processor coupled to the at least one memory and configured to: receive an unprotected management frame indicative of a disconnection of the apparatus, wherein the unprotected management frame includes an address indicative of an identified wireless access point (AP) associated with the disconnection; determine a transmitter signature associated with the unprotected management frame; determine a difference between the transmitter signature and a corresponding transmitter signature associated with a protected data frame received from the identified wireless AP; and determine, based on the difference being greater than a threshold, the unprotected management frame is not transmitted by the identified wireless AP.

In another example, a method of wireless communications at a network device is provided. The method includes: receiving an unprotected management frame indicative of a disconnection of the network device, wherein the unprotected management frame includes an address indicative of an identified wireless access point (AP) associated with the disconnection; determining a transmitter signature associated with the unprotected management frame; determining a difference between the transmitter signature and a corresponding transmitter signature associated with a protected data frame received from the identified wireless AP; and determining, based on the difference being greater than a threshold, the unprotected management frame is not transmitted by the identified wireless AP.

A non-transitory computer-readable storage medium of a network device is provided that has stored thereon instructions which, when executed by one or more processors, cause the one or more processors to: receive an unprotected management frame indicative of a disconnection of the network device, wherein the unprotected management frame includes an address indicative of an identified wireless access point (AP) associated with the disconnection; determine a transmitter signature associated with the unprotected management frame; determine a difference between the transmitter signature and a corresponding transmitter signature associated with a protected data frame received from the identified wireless AP; and determine, based on the difference being greater than a threshold, the unprotected management frame is not transmitted by the identified wireless AP.

An apparatus for wireless communications is provided. The apparatus includes: means for receiving an unprotected management frame indicative of a disconnection of the apparatus, wherein the unprotected management frame includes an address indicative of an identified wireless access point (AP) associated with the disconnection; means for determining a transmitter signature associated with the unprotected management frame; means for determining a difference between the transmitter signature and a corresponding transmitter signature associated with a protected data frame received from the identified wireless AP; and means for determining, based on the difference being greater than a threshold, the unprotected management frame is not transmitted by the identified wireless AP.

Aspects generally include a method, apparatus, system, computer program product, non-transitory computer-readable medium, user equipment, base station, wireless communication device, and/or processing system as substantially described herein with reference to and as illustrated by the drawings and specification. In some aspects, one or more of the apparatuses described above is or is part of a camera, a mobile device (e.g., a mobile telephone or so-called "smart phone" or other mobile device), a vehicle or computing system or device of a vehicle, a wearable device, an extended reality device (e.g., a virtual reality (VR) device, an augmented reality (AR) device, or a mixed reality (MR) device), a personal computer, a laptop computer, a server computer, or other device.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures:

FIG. 4 is a flowchart illustrating an example process for wireless communication, in accordance with some examples.

DETAILED DESCRIPTION

Figure 1:
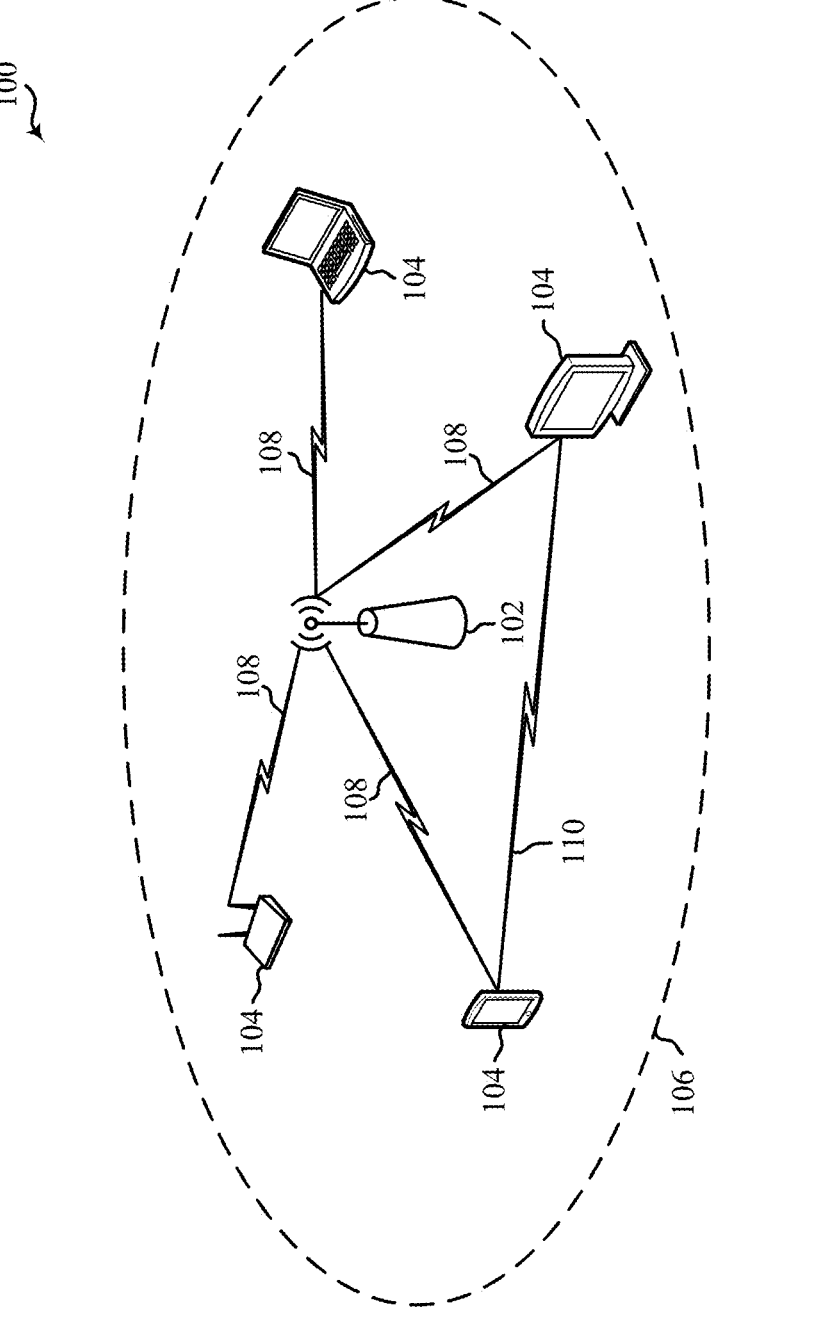
FIG. 1 is a block diagram illustrating an example wireless communication network, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Many Wi-Fi deployments (e.g., deployments of Wi-Fi networks, access points (APs), client devices or stations (STAs), etc.) do not currently support or otherwise implement the use of protected management frames, such as disassociation and/or deauthentication frames. For example, many Wi-Fi deployments currently utilize Wi-Fi Protected Access II (WPA2) in which protected management frames are optional or otherwise do not yet support Wi-Fi Protected Access III (WPA3), in which protected management frames are made mandatory. There is a need for systems and techniques that can be used to detect and prevent spoofed management frames in a Wi-Fi network that utilizes unprotected (e.g., unencrypted) management frames. There is a further need for systems and techniques that can be used to detect and prevent spoofed disassociation frames and/or spoofed deauthentication frames that are associated with a disconnect attack in a Wi-Fi network that utilizes unprotected frames (e.g., unencrypted management frames).

Systems, apparatuses, processes (also referred to as methods), and computer-readable media (collectively referred to as "systems and techniques") are described herein for detecting Wi-Fi deauthentication attacks. For example, the systems and techniques can determine one or more signatures for an unprotected Wi-Fi management frame. The signature(s) associated with a currently received unprotected (e.g., unencrypted) frame can be analyzed against one or more corresponding signatures associated with a previously received protected (e.g., encrypted) frame. In some cases, the one or more signatures can be determined by a client device or station (STA) receiving the frames from a respective one or more access points (APs). For example, the systems and techniques can be used to detect a spoofed deauthentication frame and/or a spoofed disassociation frame that is associated with a Wi-Fi deauthentication attack.

In some cases, the systems and techniques can be used to detect a Wi-Fi deauthentication attack based on determining that a MAC/PHY signature associated with an unprotected deauthentication or disassociation frame is different from a MAC/PHY signature associated with a protected frame. For example, a STA can determine one or more MAC/PHY signatures for each protected frame received from one or more APs (e.g., where the transmitting AP associated with a protected frame is determined based on a MAC address and successful decryption of the protected data frame or other AP identifier included in the protected frame and/or protected frame header).

Based on receiving an unprotected management frame (e.g., unprotected deauthentication or disassociation frame) that purports to be from an AP for which a MAC/PHY signature has previously been determined, the MAC/PHY signature of the unprotected management frame can be compared to the MAC/PHY signature of a protected data frame transmitted by the indicated AP. Based on the comparison, the systems and techniques can determine that the unprotected deauthentication or disassociation frame is authentic (e.g., non-spoofed, transmitted by the AP identified in the unprotected frame) or inauthentic (e.g., spoofed, transmitted by a spoofed AP that is different than the AP identified in the unprotected frame). In some examples, based on determining that an unprotected deauthentication or disassociation frame was transmitted by a spoofed AP, the systems and techniques can be used to drop the corresponding frame or packet and/or to indicate the attempted attack for further remediation.

Some or all of the examples described herein may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth R standards as defined by the Bluetooth Special Interest Group (SIG), or the Long Term Evolution (LTE), 3G, 4G, 5G (New Radio (NR)), or other standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU)-MIMO. The described implementations also can be implemented using other wireless communication protocols or RF signals suitable for use in one or more of a wireless personal area network (WPAN), a wireless local area network (WLAN), a wireless wide area network (WWAN), or an Internet-of-Things (IOT) network.

Further aspects of the systems and techniques will be described with respect to the figures.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

FIG. 1 is a block diagram illustrating an example wireless communication network 100. In some aspects, the wireless communication network 100 can be an example of a wireless local area network (WLAN). As used herein, a WLAN may also be referred to as a Wi-Fi network. In some examples, the WLAN 100 can be a network implementing at least one of the IEEE 802.11 family of wireless communication protocol standards (e.g., such as that defined by the IEEE 802.11-2016 specification or amendments thereof including, but not limited to, 802.11ay, 802.11ax, 802.11az, 802.11ba and 802.11be). The WLAN 100 may include at least one access point (AP) 102 and multiple associated stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), and/or a subscriber unit, among other examples. The STAs 104 may represent various devices such as mobile phones, personal digital assistant (PDAs), other handheld devices, netbooks, notebook computers, tablet computers, laptops, display devices (e.g., TVs, computer monitors, navigation systems, etc.), music or other audio or stereo devices, remote control devices ("remotes"), printers, kitchen or other household appliances, key fobs (e.g., for passive keyless entry and start (PKES) systems), etc.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102.

The AP 102 periodically broadcasts beacon frames ("beacons") including the BSSID to enable any STAs 104 within wireless range of the AP 102 to "associate" or re-associate with the AP 102 to establish a respective communication link 108 (e.g., hereinafter also referred to as a "Wi-Fi link"). STAs 104 may additionally use the beacon frames broadcast by AP 102 to maintain a communication link 108 with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 can perform passive or active scanning operations ("scans") on frequency channels in one or more frequency bands (e.g., the 2.4 GHZ, 5 GHZ, 6 GHZ, or 60 GHz bands). For example, to perform passive scanning, a STA 104 listens for beacons that are transmitted by respective APs 102 at a periodic time interval referred to as the target beacon transmission time (TBTT). The TBTT can be measured in time units (TUs). In some examples, one TU may be equal to 1024 microseconds (us). To perform active scanning, a STA 104 generates and sequentially transmits probe requests on each channel to be scanned and listens for probe responses from APs 102. Each STA 104 may be configured to identify or select an AP 102 with which to associate (e.g., based on the scanning information obtained through the passive or active scans), and to perform authentication and association operations to establish a communication link 108 with the selected AP 102. The AP 102 assigns an association identifier (AID) to the STA 104 at the culmination of the association operations, which the AP 102 uses to track the STA 104.

In some cases, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. In some examples, a STA 104 can be covered by more than one AP 102 and can associate with different APs 102 at different times for different transmissions. After association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics (e.g., such as a greater received signal strength indicator (RSSI), a reduced traffic load, etc.).

In some cases, STAs 104 may form networks without APs 102 or other equipment other than the STAs 104 themselves. One example of such a network is an ad hoc network (e.g., or wireless ad hoc network). Ad hoc networks may alternatively be referred to as mesh networks or peer-to-peer (P2P) networks. In some cases, ad hoc networks may be implemented within a larger wireless network (e.g., such as WLAN 100). In such implementations, while the STAs 104 may be capable of communicating with each other through the AP 102 using communication links 108, the STAs 104 may also communicate directly with each other (e.g., with other STAs 104) using direct wireless links 110. In some examples, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 can include one or more (or all) of Wi-Fi Direct connections, connections established by using a Wi-Fi Tunneled Direct Link Setup (TDLS) link, and other P2P group connections, etc.

The APs 102 and STAs 104 may function and communicate (e.g., using the respective communication links 108) according to the IEEE 802.11 family of wireless communication protocol standards (e.g., such as that defined by the IEEE 802.11-2016 specification or amendments thereof including, but not limited to, 802.11ay, 802.11ax, 802.11az, 802.11ba and 802.11be). These standards define the WLAN radio and baseband protocols for the physical (PHY) and medium access control (MAC) layers. For example, the APs 102 and STAs 104 transmit and receive wireless communications (e.g., hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHZ band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax, and 802.11be standard amendments may be transmitted over the 2.4, 5 GHz or 6 GHz bands, each of which is divided into multiple 20 MHZ channels. As such, these PPDUs are transmitted over a physical channel having a minimum bandwidth of 20 MHZ. In some cases, larger bandwidth channels can be formed through channel bonding. For example, PPDUs may be transmitted over physical channels having bandwidths of 40 MHZ, 80 MHZ, 160 or CCC20 MHZ by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

As mentioned previously, a Wi-Fi network (e.g., such as WLAN 100) can utilize different frames (e.g., different frame types and/or different frame structures) for wireless communications. Wi-Fi frames may also be referred to as datagrams or L2 datagrams. In one illustrative example, a Wi-Fi network can utilize management frames, control frames, and data frames. Management frames can be used to manage a BSS, control frames can be used to control access to the physical transmission medium, and data frames can be used to transmit payload data. In some aspects, data frames may carry payloads that are indicative of Layer 3-7 information (e.g., based on the OSI model of communications).

Each Wi-Fi frame can include a Media Access Control (MAC) header, a payload, and a frame check sequence (FCS). In some cases, a Wi-Fi frame may be generated (e.g., transmitted, received, etc.) without including a payload. In some examples, the first two bytes of the MAC header can be indicative of a frame control field specifying the form and function of the frame. For example, the frame control field can include one or more bits indicative of the type of the associated Wi-Fi frame (e.g., management frame, control frame, data frame). In one illustrative example, the frame control field can include two bits that are indicative of the frame type of the Wi-Fi frame that includes the MAC header (e.g., which itself includes the frame control field bits).

The MAC header of a Wi-Fi frame can additionally include a sequence control field. The sequence control field is a two-byte section that can be used to indicate or identify message order and/or to eliminate duplicate frames. The sequence control field can include a 4-bit fragmentation number followed by a 12-bit sequence number. Wi-Fi frames transmitted between a given AP-STA pair can each be associated with a unique sequence control value (e.g., also referred to as a sequence control number or a sequence number). The sequence control value can be maintained and incremented as a separate sequence (e.g., counter) for each different AP-STA pair that uses one or more Wi-Fi frames to perform wireless communication with one another.

Management frames can be used for the maintenance, or discontinuance, of communication between an AP and a STA. For example, management frame sub-types include authentication frames, association frames, deauthentication frames, and disassociation frames, among others.

Authentication frames can include authentication request frames that are transmitted from a STA to an AP, requesting authentication of the STA to access the AP and/or a WLAN (e.g., Wi-Fi network) associated with the AP. An authentication request frame can include or otherwise be indicative of an identity of the STA. The AP can perform authentication of the indicated STA identity and may generate and transmit an authentication response frame. The authentication response frame can be indicative of the authentication result for the STA (e.g., acceptance or rejection). The authentication result may also be referred to as an authentication status of the STA.

An association request frame can be transmitted from a STA to an AP. The association request frame can be used by the AP to allocate resources and synchronize with the STA. For example, the association request frame can be indicative of information about the STA, such as the SSID of the network the STA wishes to associate with (e.g., connect to). An AP may accept or not accept an association request indicated by an association request frame. If the association request is accepted, the AP can reserve memory and establish an association ID for the STA.

An association response frame is transmitted from the AP to the STA (e.g., the STA that transmitted an association request frame received by the AP). The association response frame can be indicative of the AP's acceptance or rejection of the STA's association request. If the association response is an acceptance, then the association response frame transmitted by the AP can be indicative of the association ID information, supported data rate information, etc.

A disassociation frame can be transmitted by a STA or an AP. Disassociation frames can be used to terminate a STA's association (e.g., a STA's association with an AP). Disassociation frames may be implemented as notification-type frames for which a response is not expected. For example, a STA may transmit a disassociation frame to an AP prior to powering off. In another example, an AP can transmit a disassociation frame to a STA in order to disassociate the STA from the AP. An AP may disassociate a STA based on factors such as failure to properly authenticate, load balancing, timeout, entering a state of maintenance, etc. A disassociation frame can include a reason code in the body of the disassociation frame.

When a STA is disassociated, the STA maintains its authentication with the AP that transmitted the disassociation frame received by the STA. For example, maintaining authentication of the STA can permit easier association with the same AP at some future time. In one illustrative example, a STA that disassociates from an AP (e.g., based on the STA transmitting a disassociation frame to the AP, or the STA receiving a disassociation frame from the AP) can re-connect to the AP (e.g., re-associate) by transmitting an association request frame at a future time.

A deauthentication frame can be transmitted from an AP to a STA. Deauthentication frames can be used to reset the state machine of an associated client (e.g., a STA receiving the deauthentication frame). A deauthentication frame can include a reason code in the body of the deauthentication frame. When a STA receives a deauthentication frame, the STA is deauthenticated from the AP and is also disassociated from the AP (e.g., based on authentication being performed prior to association in the connection process between a STA and an AP). A STA that is deauthenticated from an AP must transmit an authentication request frame and an association request frame to the AP in order to reconnect at a future time.

The Wi-Fi Protected Access (WPA) protocol can be used to secure Wi-Fi networks and/or other WLANs. The WPA protocol includes WPA, WPA2, and WPA3. A Wi-Fi network secured using WPA can be password-protected with exchanged cryptographic keys used to encrypt frames transmitted between a given AP and STA. For example, a four-way handshake can be used for an AP and a STA to exchange transmission keys.

Wi-Fi frames may be protected frames or may be unprotected frames. A protected frame is transmitted after key establishment (e.g., between an AP and a STA) and may be protected using existing protection key hierarchies in the 802.11 standard and its amendments. For example, the WPA keys exchanged between an AP and a STA using a four-way handshake can be used to protect (e.g., encrypt) a protected frame. Wi-Fi data frames are transmitted as protected frames.

An unprotected frame is transmitted without the use of a protection key hierarchy. For example, an unprotected frame may be transmitted before an AP and STA have completed key establishment (e.g., transmitted prior to the completion of the four-way handshake used to exchange transmission keys). An unprotected frame may also be transmitted after an AP and STA have completed key establishment (e.g., transmission keys have been exchanged, but are not used for transmitting the unprotected frame).

Some Wi-Fi management frames are always transmitted as unprotected frames. Other Wi-Fi management frames may be transmitted as either protected or unprotected. For example, Wi-Fi management frames that are transmitted before WPA key establishment are transmitted as unprotected frames. The required Wi-Fi management frames transmitted prior to the four-way handshake for WPA key exchange include beacon frames, authentication frames, and association frames, among others.

Wi-Fi management frames that are transmitted after WPA key establishment may be transmitted as either protected frames or unprotected frames. Wi-Fi management frames transmitted after key establishment can also be referred to as "protection-capable management frames." Protection-capable management frames include disassociation frames and deauthentication frames, among others. WPA3 mandates that protection-capable management frames be transmitted as protected (e.g., encrypted) frames. For example, an AP that implements WPA3 will always transmit protected (e.g., encrypted) disassociation frames and deauthentication frames.

In Wi-Fi networks that implement WPA2, the use of protected management frames is optional. For example, a WPA2 Wi-Fi network may be configured to utilize protected disassociation and deauthentication frames that are encrypted using the WPA2 keys exchanged between an AP and a STA (e.g., protected disassociation and deauthentication frames may be encrypted in the same way as Wi-Fi data frames). However, a WPA2 Wi-Fi network may also be configured to utilize unprotected disassociation and deauthentication frames that are sent in the open and without integrity checks. Unprotected disassociation and/or deauthentication frames are unencrypted and may be vulnerable to attack.

For example, when a Wi-Fi network does not use protected management frames (and in particular, does not use protected disassociation and/or deauthentication frames), an attacker can inject a spoofed disassociation or deauthentication frame to disconnect one or more STAs from the network. In some examples, a spoofed deauthentication frame can be injected to force a STA to reconnect to the network, and the attacker can subsequently capture the authentication frames exchanged during the forced reconnections to execute a dictionary attack on the passphrase associated with the Wi-Fi network.

Figure 2:
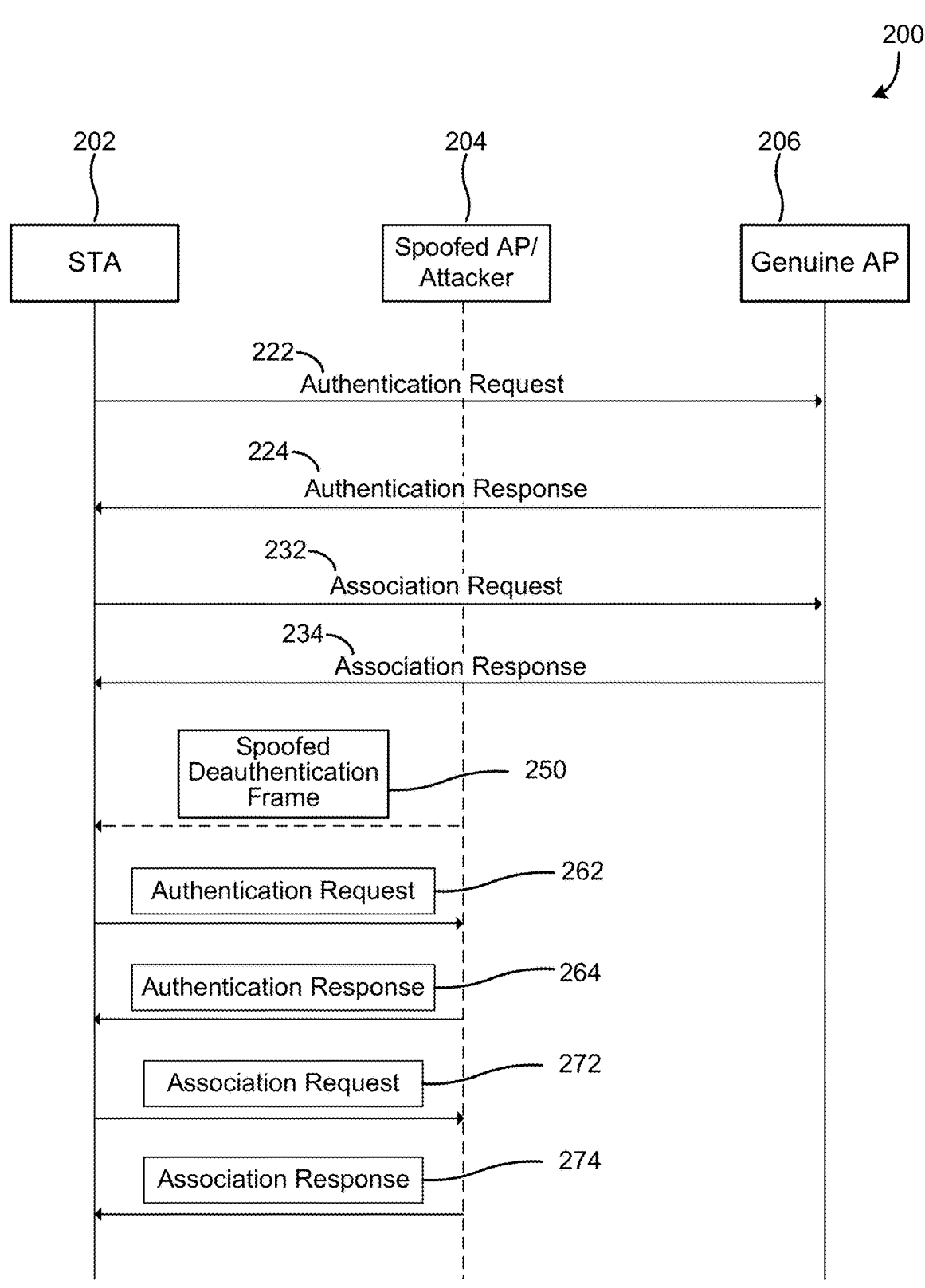
FIG. 2 is a diagram illustrating an example communications flow associated with a Wi-Fi deauthentication attack, in accordance with some examples.

FIG. 2 is a diagram illustrating an example communications flow 200 associated with a Wi-Fi deauthentication attack (e.g., also referred to herein as a Wi-Fi disconnect attack). In a Wi-Fi disconnect attack, a STA 202 may initiate communications with a genuine AP 206 before subsequently receiving a spoofed, unprotected deauthentication or disassociation frame from a spoofed AP 204 (e.g., also referred to as an attacker AP). Based on receiving the spoofed deauthentication or disassociation frame, STA 202 may be disconnected from the genuine AP 206 and forced to connect to the spoofed AP 204, as will be described in greater depth below.

To register with the genuine AP 206, STA 202 can transmit an authentication request frame 222, as described previously above. Based on receiving the authentication request frame 222, the genuine AP 206 authenticates (e.g., accepts or rejects) the STA 202 and transmit an authentication response frame 224, indicative of the authentication result (e.g., as also described above). If the authentication response frame 224 indicates an 'accept' authentication result, STA 202 transmits an association request frame 232 to genuine AP 206 and subsequently receives (e.g., from genuine AP 206) a corresponding association response frame 234 (e.g., as also described above).

The authentication request and response frames 222,224 (respectively) and the association request and response frames 232,234 (respectively) may each be an unprotected (e.g., unencrypted) management frame. For example, because authentication and association frames are transmitted prior to key establishment (e.g., WPA2, WPA3, etc.) between the STA 202 and genuine AP 206, authentication and association frames are unprotected frames in both WPA2 and WPA3-based Wi-Fi networks.

After receiving the association response frame 234, the STA 202 can connect to genuine AP 206 and the corresponding Wi-Fi network associated with genuine AP 206. Once connected, STA 202 and genuine AP 206 can perform unidirectional and/or bidirectional communications.

A spoofed AP 204 can generate and transmit a spoofed, unprotected deauthentication frame 250 that causes STA 202 to disconnect from the genuine AP 206. The spoofed deauthentication frame 250 can be a unicast frame (e.g., transmitted from spoofed AP 204 to STA 202) or may be a broadcast frame (e.g., broadcast from spoofed AP 204 to a plurality of STAs including STA 202). The spoofed AP 204 can also be referred to as an attacker AP and/or a malicious AP. Spoofed AP 204 is different than genuine AP 206 and may not be connected to or otherwise associated with the same Wi-Fi network as genuine AP 206.

For example, the spoofed AP 204 may "spoof" the genuine AP 206 based on retrieving the MAC address of the genuine AP 206 and the BSSID of the Wi-Fi network associated with genuine AP 206. By transmitting Wi-Fi frames that are altered (e.g., spoofed) to include the MAC address of the genuine AP 206 and the corresponding Wi-Fi network BSSID, the altered Wi-Fi frames transmitted by spoofed AP 204 will appear (e.g., to STA 202) to have been transmitted by the genuine AP 206.

In some aspects, when genuine AP 206 does not support or does not implement management frame protection, STA 202 will treat the spoofed deauthentication frame 250 (e.g., transmitted by spoofed AP 204) as a legitimate deauthentication frame indicative of a disconnect command from genuine AP 206. As mentioned previously, the spoofed deauthentication frame 250 can be a unicast frame or a multicast (e.g., broadcast) frame. When genuine AP 206 does not support or implement management frame protection, spoofed AP 204 can generate and transmit a spoofed, unicast deauthentication frame 250 based on determining the MAC address of genuine AP 206, the BSSID of the corresponding Wi-Fi network associated with genuine AP 206, and the MAC address of STA 202. To generate and transmit a spoofed, broadcast deauthentication frame 250, the spoofed AP 250 does not need to determine connected client (e.g., STA) MAC addresses, and may utilize only the MAC address of the genuine AP 206 and the corresponding BSSID.

In some cases, MAC addresses (e.g., of genuine AP 206, STA 202, and/or any other connected clients associated with genuine AP 206) and BSSIDs can be obtained by spoofed AP 204 using packet sniffing on one or more Wi-Fi channels. After spoofed AP 204 generates and transmits the spoofed deauthentication frame 250 to STA 202, the connection between STA 202 and genuine AP 206 is terminated (e.g., STA 202 is disassociated and deauthenticated from genuine AP 206).

A disconnect attack can be performed based on using the spoofed deauthentication frame 250 to force one or more clients (e.g., STA 202) to disconnect from genuine AP 206. A repeatedly performed disconnect attack may be used to implement a Denial of Service (DOS) attack. In some cases, a disconnect attack can cause an unstable connection between STA 202 and genuine AP 206 and/or may cause STA 202 to blacklist genuine AP 206 (and/or the whole Wi-Fi network associated with genuine AP 206) for an extended period of time. Disconnect attacks may also be utilized to implement dictionary attacks against the passphrase used to secure a Wi-Fi network using WPA2 (e.g., WPA2-Personal) encryption. For example, in such scenarios, spoofed AP 204 may perform a disconnect attack for a relatively short period of time, interrupting the connection to STA 202 and forcing STA 202 to reconnect to Wi-Fi network associated with genuine AP 206. An attacker (e.g., spoofed AP 204 and/or other device associated with spoofed AP 204) can capture the authentication frames exchanged between STA 202 and genuine AP 206 during the forced reconnection in order to execute a dictionary attack on the passphrase used to secure to corresponding Wi-Fi network.

In still further examples, a disconnect or deauthentication attack can be extended to perform a honeypot or man-in-the-middle attack, which can be used to manipulate one or more client devices (e.g., STA 202) to move away from the AP to which they are currently connected (e.g., genuine AP 206) and instead join the attacker's AP (e.g., spoofed AP 204). For example, as illustrated in FIG. 2, after transmitted the spoofed deauthentication frame 250 that causes STA 202 to disconnect from genuine AP 206, STA 202 may be driven to connect to spoofed AP 204 (e.g., rather than reconnecting to genuine AP 206). The connection between STA 202 and spoofed AP 204 can be performed based on an authentication request frame 262, an authentication response frame 264, an association request frame 272, and an association response frame 274, which may be the same as or similar to those described above with respect to the connection established between STA 202 and genuine AP 206. After STA 202 is driven to connect with spoofed AP 204, the spoofed AP 204 can monitor the data to and from STA 202.

Many Wi-Fi deployments (e.g., deployments of Wi-Fi networks, APs, STAs, etc.) do not currently support or otherwise implement the use of protected management frames, such as disassociation and/or deauthentication frames. For example, many Wi-Fi deployments currently utilize WPA2 (e.g., in which protected management frames are optional) or otherwise do not yet support WPA3 (e.g., in which protected management frames are made mandatory).

There is a need for systems and techniques that can be used to detect and prevent spoofed management frames in a Wi-Fi network that utilizes unprotected (e.g., unencrypted) management frames. There is a further need for systems and techniques that can be used to detect and prevent spoofed disassociation frames and/or spoofed deauthentication frames that are associated with a disconnect attack in a Wi-Fi network that utilizes unprotected frames (e.g., unencrypted management frames).

Systems, apparatuses, processes (also referred to as methods), and computer-readable media (collectively referred to as "systems and techniques") are described herein for detecting Wi-Fi deauthentication attacks. For example, the systems and techniques can determine one or more transmitter signatures for an unprotected Wi-Fi management frame. The transmitter signature(s) associated with a currently received unprotected (e.g., unencrypted) frame can be analyzed against one or more corresponding transmitter signatures associated with a previously received protected (e.g., encrypted) frame. In some cases, the one or more transmitter signatures can be determined by a client device or station (STA) receiving the frames from a respective one or more access points (APs). In one illustrative example, the systems and techniques can be used to detect a spoofed deauthentication frame and/or a spoofed disassociation frame that is associated with a Wi-Fi deauthentication attack.

For example, the systems and techniques can be used to detect a Wi-Fi deauthentication attack based on determining that a MAC/PHY transmitter signature associated with an unprotected deauthentication or disassociation frame is different from a MAC/PHY transmitter signature associated with a protected frame. In some aspects, a protected frame received by a given STA can include information indicative of the AP that transmitted the protected frame to the STA. In some cases, a STA can determine one or more MAC/PHY transmitter signatures for each protected frame received from one or more APs. In some examples, a STA may determine one or more MAC/PHY transmitter signatures for at least one protected frame transmitted by a respective one or more APs. Based on receiving an unprotected management frame (e.g., unprotected deauthentication or disassociation frame) that purports to be from an AP for which a MAC/PHY transmitter signature has previously been determined, the MAC/PHY transmitter signature of the unprotected management frame can be compared to the MAC/PHY transmitter signature of a protected management frame transmitted by the indicated AP. Based on the comparison, the systems and techniques can determine that the unprotected deauthentication or disassociation frame is authentic (e.g., non-spoofed, transmitted by the AP identified in the unprotected frame) or inauthentic (e.g., spoofed, transmitted by a spoofed AP that is different than the AP identified in the unprotected frame). In some examples, based on determining that an unprotected deauthentication or disassociation frame was transmitted by a spoofed AP, the systems and techniques can be used to drop the corresponding frame or packet and/or to indicate the attempted attack for further remediation.

Figure 3:
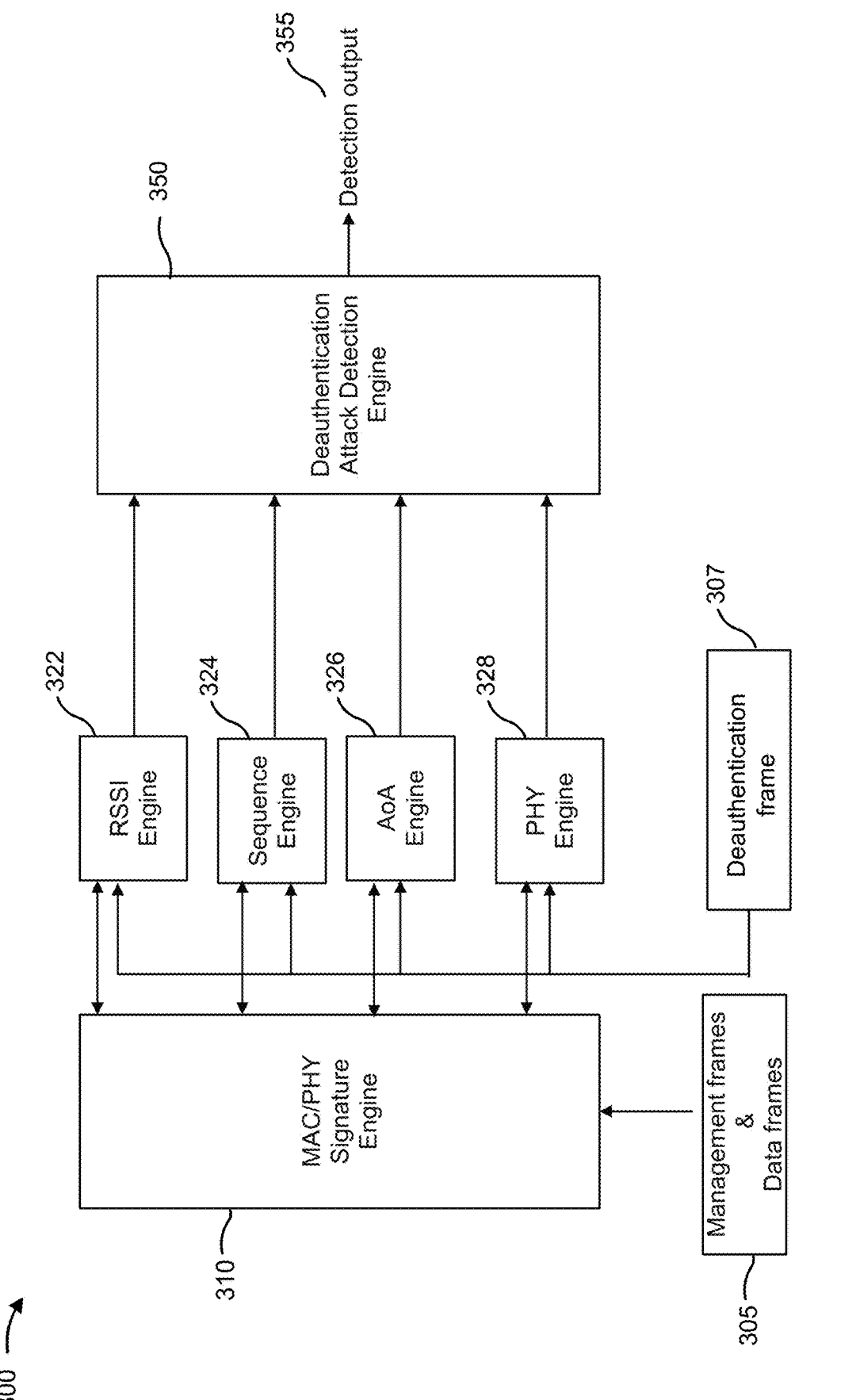
FIG. 3 is a diagram illustrating an example system that can be used to detect a Wi-Fi deauthentication attack and/or to detect a spoofed unprotected Wi-Fi management frame, in accordance with some examples.

FIG. 3 is a diagram 300 illustrating an example system 300 that can be used to detect a Wi-Fi deauthentication attack and/or to detect a spoofed unprotected Wi-Fi management frame. For example, the deauthentication detection system 300 can be included in or implemented by a STA or other wireless client device to detect and prevent Wi-Fi deauthentication attacks that use spoofed deauthentication frames (e.g., such as spoofed deauthentication frame 250 illustrated in FIG. 2).

In one illustrative example, the systems and techniques described herein can be used to detect if a given unprotected deauthentication frame 307 was transmitted by a genuine AP (e.g., an AP to which a STA was previously or most recently connected) or transmitted by a spoofed AP. For example, a MAC/PHY signature engine 310 can be used to generate or otherwise determine one or more transmitter signatures associated with received Wi-Fi frames 305. The received Wi-Fi frames 305 can include management frames and/or data frames. In some aspects, the received Wi-Fi frames 305 can be management and/or data frames received at a STA that includes or implements the deauthentication detection system 300.

In some aspects, MAC/PHY signature engine 310 can determine a MAC/PHY transmitter signature for some (or all) of the Wi-Fi frames received at a given STA that includes or implements the deauthentication detection system 300. In some examples, MAC/PHY transmitter signature engine 310 may determine a MAC/PHY transmitter signature for a portion of the Wi-Fi frames received at the given STA, may determine a MAC/PHY transmitter signature for protected (e.g., encrypted) data frames received at the given STA, etc. MAC/PHY transmitter signature determined for previously received frames at the given STA can be stored and associated with a corresponding AP used that transmitted each respective one of the previously received frames.

Based on determining and storing MAC/PHY transmitter signatures for previously received frames (e.g., previously received protected frames and/or protected data frames) transmitted by one or more APs, the systems and techniques can be used to detect spoofed deauthentication frames. For example, a MAC/PHY transmitter signature can be determined for an unprotected deauthentication frame 307 and compared to one or more MAC/PHY transmitter signatures determined for previously received protected frames that were transmitted by the same AP (e.g., same AP MAC address) as is indicated in the unprotected deauthentication frame.

In some aspects, MAC/PHY transmitter signature analysis for unprotected deauthentication frame 307 can be performed using one or more (or all) of a received signal strength indicator (RSSI) engine 322, a sequence engine 324, an angle-of-arrival (AoA) engine 326, and a PHY engine 328. For example, a MAC/PHY signature determined for a given Wi-Fi frame can include one or more different transmitter signatures. In some aspects, a MAC/PHY signature can include a sequence number transmitter signature, an RSSI transmitter signature, a PHY transmitter signature, and/or an AoA transmitter signature. Each transmitter signature type can be associated with a corresponding engine (e.g., engines 322-328) for comparing the transmitter signature determined for deauthentication frame 307 with the transmitter signature(s) determined for one or more previously received frames 305.

For example, RSSI engine 322 can determine a difference between the RSSI of the deauthentication frame 307 received at a given STA and the RSSI of one or more previously received encrypted (e.g., protected) data frames received at the given STA. The previously received protected data frames can be included in the previously received frames 305 and can include one or more of the data frames that were received at the STA immediately prior to receiving the deauthentication frame 307. In some cases, individual comparisons can be performed between the RSSI of deauthentication frame 307 and the RSSI of each respective one of the previously received protected data frames. In some examples, the RSSI of deauthentication frame 307 can be compared to an average, maximum, minimum, etc., RSSI determined for a plurality of previously received protected data frames. As mentioned previously, RSSI engine 322 can compare the RSSI of deauthentication frame 307 to the RSSI of previously received protected data frames that were transmitted by the same AP as is identified in the header of the deauthentication frame 307.

Sequence engine 324 can be used to determine a sequence jump (e.g., a sequence difference) between the deauthentication frame 307 and previous management frames received from the same AP as is identified in the header of the deauthentication frame 307. For example, Wi-Fi management frames transmitted between a given AP-STA pair can each be associated with a unique sequence value, which may be incremented for each frame transmitted between the AP-STA pair. In some aspects, the sequence value may be incremented between 0-4096. If the deauthentication frame 307 is a legitimate deauthentication frame transmitted by the genuine AP (e.g., the AP to which the STA was most recently connected to), then the sequence difference between the deauthentication frames and the previous management frames coming from the same genuine AP should be relatively small. If deauthentication frame 307 is a spoofed frame transmitted by a spoofed AP (e.g., an AP with which the STA is not connected and/or was not previously connected), then the sequence value of the spoofed deauthentication frame from the spoofed AP is unlikely to be similar to the sequence values of recently received management frames from the genuine AP.

AoA engine 326 can be used to determine a jump or a difference in the AoA (e.g., angle of arrival) measured for an unprotected deauthentication frame 307 purporting to be transmitted by a genuine AP and the AoA measured for one or more previously received, protected (e.g., encrypted) data frames that were transmitted by the genuine AP. For example, the AoA engine 326 can determine a difference in AoA between the deauthentication frame 307 and one or more previously received protected data frames by determining individual AoA differences between the deauthentication frame 307 and each respective one of the previously received protected data frames. In some aspects, AoA engine 326 can determine a difference in AoA between the deauthentication frame 307 and an average, maximum, minimum, etc., AoA value determined for ta plurality of previously received protected data frames. For example, a large variation or sudden jump in AoA between a deauthentication frame 307 purporting to be from a genuine AP and the previously received protected (e.g., encrypted) data frames transmitted by the genuine AP may indicate that the deauthentication frame 307 was transmitted by a spoofed AP (e.g., deauthentication frame 307 is a spoofed deauthentication frame).

PHY engine 328 can be used to determine one or more differences between an AP that transmitted the unprotected deauthentication frame 307 and the AP that transmitted one or more previously received protected frames (e.g., data frames). For example, PHY engine 328 can determine a PHY transmitter signature indicative of physical transmission layer characteristics associated with a given frame received from a given AP. In one illustrative example, PHY engine 328 can determine a PHY transmitter signature based on one or more of an amplitude and/or phase shift of each subcarrier of a received frame (e.g., deauthentication frame 307, previously received frames 305, etc.). In some aspects, the PHY transmitter signature can further include or otherwise be indicative of an IQ imbalance associated with a received frame. For example, a determination that the PHY transmitter signature associated with a deauthentication frame 307 purporting to be from a genuine AP differs beyond a threshold amount from the PHY transmitter signature associated with one or more previously received protected frames from the genuine AP can be indicative that deauthentication frame 307 is a spoofed deauthentication frame transmitted by a spoofed AP.

In one illustrative example, a deauthentication attack detection engine 350 can generate a detection output 355 indicative of whether the unprotected deauthentication frame 307 is a spoofed deauthentication frame (e.g., transmitted by a spoofed AP) or a genuine deauthentication frame (e.g., transmitted by a genuine AP). For example, deauthentication attack detection engine 350 can receive as input a MAC/PHY transmitter signature information from one or more (or all) of the RSSI engine 322, the sequence engine 324, the AoA engine 326, and the PHY engine 328. Based on the combined transmitter signature information, deauthentication attack detection engine 350 can generate the detection output 355, indicative of a spoofed or genuine deauthentication frame 307.

In some aspects, the output of RSSI engine 322 can include one or more $\Delta$RSSI values. For example, deauthentication attack detection engine 350 can receive a $\Delta$RSSI value associated with deauthentication frame 307 and can compare $\Delta$RSSI to a first threshold $T_1$. The result of the comparison $\Delta$RSSI$>T_1$ can be a Boolean variable $v_1$. For example, a first value of $v_1$ (e.g., 1 or 0, True or False, etc.) can indicate that the $\Delta$RSSI associated with deauthentication frame 307 exceeds the first threshold $T_1$ and a second value of $v_1$ can indicate that the $\Delta$RSSI associated with deauthentication frame 307 is below the first threshold $T_1$. In some examples, the evaluation of $\Delta$RSSI against the first threshold $T_1$ can be performed using RSSI engine 322, and the input to deauthentication attack detection engine 350 can be the Boolean variable $v_1$.

In some examples, the output of sequence engine 324 can include one or more ASN values (e.g., sequence delta values). For example, deauthentication attack detection engine 350 can receive a ASN value associated with deauthentication frame 307 and can compare ASN to a second threshold $T_2$. The result of the comparison $\Delta$SN$>T_2$ can be a Boolean variable $v_2$. For example, a first value of $v_2$ (e.g., 1 or 0, True or False, etc.) can indicate that the $\Delta$SN associated with deauthentication frame 307 exceeds the second threshold $T_2$ and a second value of $v_2$ can indicate that the $\Delta$SN associated with deauthentication frame 307 is below the second threshold $T_2$. In some examples, the evaluation of $\Delta$SN against the second threshold $T_2$ can be performed using sequence engine 324, and the input to deauthentication attack detection engine 350 can be the Boolean variable $v_2$.

In some examples, the output of AoA engine 326 can include one or more $\Delta$AoA values. For example, deauthentication attack detection engine 350 can receive a $\Delta$AoA value associated with deauthentication frame 307 and can compare $\Delta$AoA to a third threshold $T_3$. The result of the comparison $\Delta$AoA$>T_3$ can be a Boolean variable $v_3$. For example, a first value of $v_3$ (e.g., 1 or 0, True or False, etc.) can indicate that the $\Delta$AoA associated with deauthentication frame 307 exceeds the third threshold $T_3$ and a second value of $v_3$ can indicate that the $\Delta$AoA associated with deauthentication frame 307 is below the third threshold $T_3$. In some examples, the evaluation of $\Delta AoA$ against the third threshold $T_3$ can be performed using AoA engine 326, and the input to deauthentication attack detection engine 350 can be the Boolean variable $v_3$.

In some examples, the output of PHY engine 328 can include one or more $\Delta PHY$ values. For example, deauthentication attack detection engine 350 can receive a $\Delta PHY$ value associated with deauthentication frame 307 and can compare $\Delta PHY$ to a fourth threshold $T_4$. The result of the comparison $\Delta PHY > T_4$ can be a Boolean variable $v_4$. For example, a first value of $v_4$ (e.g., 1 or 0, True or False, etc.) can indicate that the $\Delta PHY$ associated with deauthentication frame 307 exceeds the fourth threshold $T_4$ and a second value of $v_4$ can indicate that the $\Delta PHY$ associated with deauthentication frame 307 is below the fourth threshold $T_4$. In some examples, the evaluation of $\Delta PHY$ against the fourth threshold $T_4$ can be performed using PHY engine 328, and the input to deauthentication attack detection engine 350 can be the Boolean variable $v_4$.

In one illustrative example, one or more (or all) of the thresholds $T_1$, $T_2$, $T_3$, $T_4$ can be configurable values associated with the example deauthentication detection system 300. For example, when deauthentication detection system 300 is included in or implemented by a STA or other client device, the STA may adjust one or more of the four threshold values. In some cases, the STA may adjust one or more of the four threshold values based on configuration or adjustment information received from an AP or other STA associated with or included in a same Wi-Fi network.

In another illustrative example, deauthentication attack detection engine 350 can apply one or more weightings to the respective Boolean variables $v_1$, $v_2$, $v_3$, $v_4$ associated with the MAC/PHY transmitter signature analysis at the engines 322, 324, 326, 328, respectively. For example, a first weight value $w_1$ can be associated with $\Delta RSSI$ and/or the corresponding determination $v_1$, a second weight value $w_2$ can be associated with $\Delta SN$ and/or the corresponding determination $v_2$, a third weight value $w_3$ can be associated with $\Delta AoA$ and/or the corresponding determination $v_3$, and a fourth weight value $w_4$ can be associated with $\Delta PHY$ and/or the corresponding determination $v_4$. In some aspects, the four weight values can be the same (e.g., $w_1 = w_2 = w_3 = w_4 = 0.25$). In some cases, one or more (or all) of the four weight values can be different.

In one illustrative example, the spoofed deauthentication frame detection output 355 can be determined based on a spoof value $= w_1 * v_1 + w_2 * v_2 + w_3 * v_3 + w_4 * v_4$. In some aspects, the spoofed deauthentication frame detection output 355 can be determined based on comparing the calculated spoof value against a spoof detection threshold. For example, the spoof detection threshold may be 0.7, wherein the deauthentication frame 307 is identified as a spoofed deauthentication frame if the spoof value >0.7 and is identified as a genuine deauthentication frame if the spoof value <0.7. For example, if all four MAC/PHY transmitter signature detection values $v_1 - v_4$ are weighted equally (e.g., $w_1 = w_2 = w_3 = w_4 = 0.25$), then the spoofed deauthentication frame detection output 355 will indicate that the deauthentication frame 307 is spoofed if three or more of the MAC/PHY transmitter signature detection values are true (e.g., if three or more of the four MAC/PHY transmitter signature detection values exceed their respective thresholds).

FIG. 4 is a flowchart illustrating an example of a process 400 for wireless communication. The process 400 can be performed by a network device, such as a station (e.g., the station (STA) 104 of FIG. 1), or a component of the network device (e.g., a chipset, a processor, etc.). The operations of the process 400 may be implemented as software components that are executed and run on one or more processors (e.g., the processor 510 of FIG. 5 and/or other processor(s)). Further, the transmission and reception of signals by the wireless communications device in the process 400 may be enabled, for example, by one or more antennas and/or one or more transceivers such as wireless transceiver(s) (e.g., the communication interface 540 of FIG. 5, and/or other antenna(s) and/or transceiver(s)).

At block 402, the network device (or component thereof) can receive an unprotected management frame indicative of a disconnection of the network device. The unprotected management frame includes an address indicative of an identified wireless access point (AP) associated with the disconnection. In one illustrative example, the address is a Media Access Control (MAC) address associated with the identified wireless AP. In some cases, the unprotected management frame is a deauthentication frame indicative of the identified wireless AP deauthenticating the network device. In some examples, the unprotected management frame is a disassociation frame indicative of the identified wireless AP disassociating the network device.

At block 404, the network device (or component thereof) can determine a transmitter signature associated with the unprotected management frame. At block 406, the network device (or component thereof) can determine a difference between the transmitter signature and a corresponding transmitter signature associated with a protected data frame received from the identified wireless AP. In some aspects, the protected data frame is received prior to the unprotected management frame and includes the address indicative of the identified wireless AP. In some cases, the corresponding transmitter signature is a stored transmitter signature associated with the address indicative of the identified wireless AP.

In some examples, the transmitter signature includes a first sequence value associated with receiving the unprotected management frame and the corresponding transmitter signature includes a second sequence value associated with a previously received management frame from the identified wireless AP. Additionally or alternatively, in some examples, the transmitter signature includes a first received signal strength indicator (RSSI) value associated with receiving the unprotected management frame and the corresponding transmitter signature includes a second RSSI value associated with a previously received protected data frame from the identified wireless AP. Additionally or alternatively, in some examples, the transmitter signature includes a first angle-of-arrival (AoA) value associated with receiving the unprotected management frame and the corresponding transmitter signature includes a second AoA value associated with a previously received protected data frame from the identified wireless AP. Additionally or alternatively, in some cases, the transmitter signature includes one or more of a first amplitude and a first phase shift associated with a subcarrier of the unprotected management frame and the corresponding transmitter signature includes one or more of a second amplitude and a second phase shift associated with a subcarrier of a previously received protected data frame from the identified wireless AP.

In some aspects, the network device (or component thereof) can determine a second transmitter signature associated with the unprotected management frame. The network device (or component thereof) can determine a corresponding second transmitter signature associated with the protected data frame. The network device (or component thereof) can further determine a second difference between the second transmitter signature and the corresponding second transmitter signature. To determine the unprotected management frame was not transmitted by the identified wireless AP, the network device (or component thereof) can weight the difference between the transmitter signature and the corresponding transmitter signature using a first weight value, and weight the second difference using a second weight value. The network device (or component thereof) can determine the unprotected management frame was not transmitted by the identified wireless AP based on the weighted differences.

At block 408, the network device (or component thereof) can determine, based on the difference being greater than a threshold, the unprotected management frame is not transmitted by the identified wireless AP. In some aspects, the network device (or component thereof) can drop the unprotected management frame based on determining that the unprotected management frame is not transmitted by the identified wireless AP. In some aspects, the network device (or component thereof) can determine, based on the difference being greater than the threshold, that the unprotected management frame is a spoofed deauthentication frame transmitted by a spoofed AP different from the identified wireless AP.

In some examples, the processes described herein (e.g., process 400 and/or any other process described herein) may be performed by a computing device, apparatus, or system. In one example, the process 400 can be performed by a computing device or system having the computing device architecture 500 of FIG. 5. The computing device, apparatus, or system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 500 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 400 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 400 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 5:
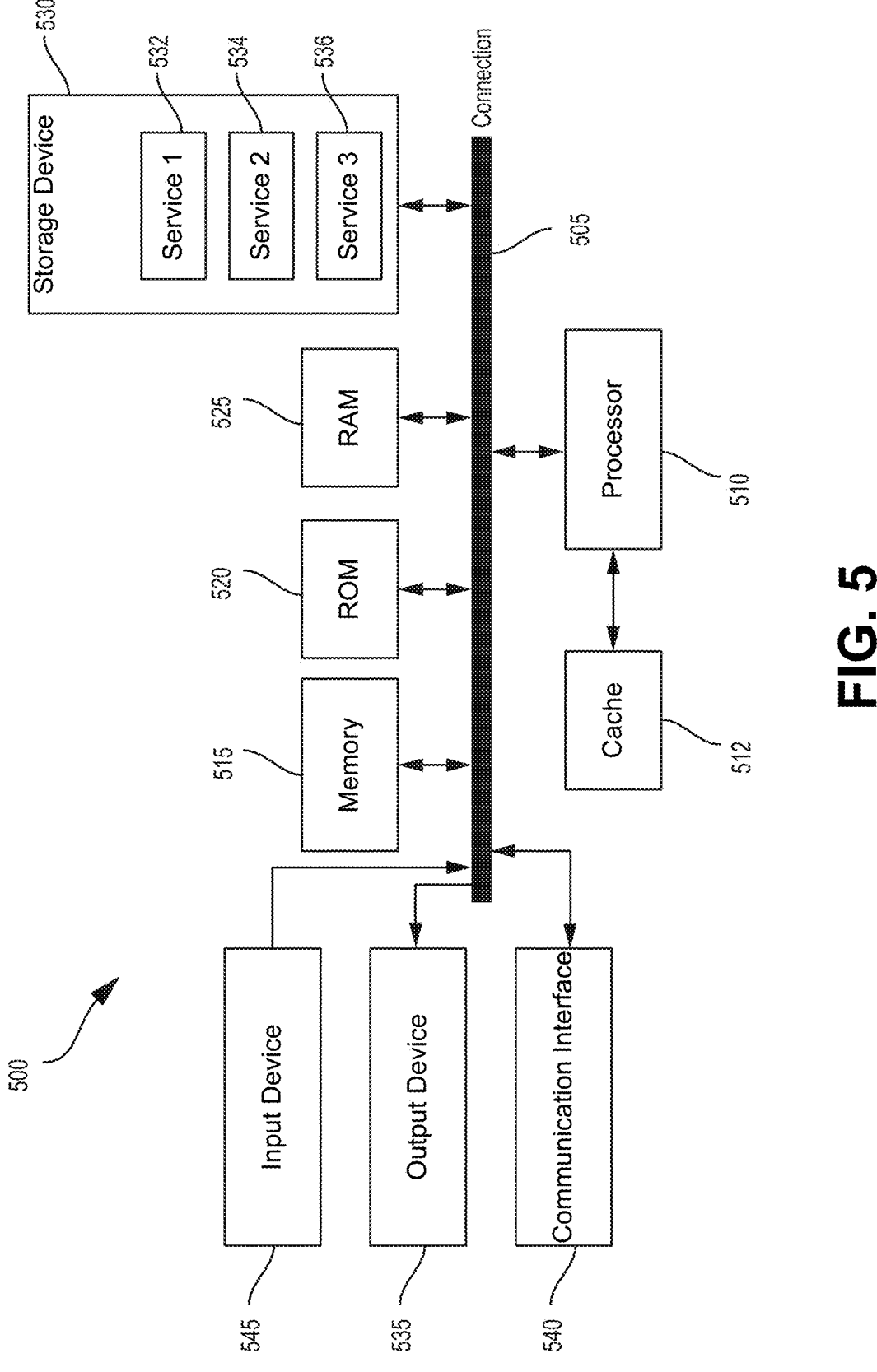
FIG. 5 is a block diagram illustrating an example of a computing system for implementing certain aspects described herein, in accordance with some examples.

FIG. 5 illustrates an example computing device architecture 500 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 500 are shown in electrical communication with each other using connection 505, such as a bus. The example computing device architecture 500 includes a processing unit (CPU or processor) 510 and computing device connection 505 that couples various computing device components including computing device memory 515, such as read only memory (ROM) 520 and random-access memory (RAM) 525, to processor 510.

Computing device architecture 500 can include a cache of high-speed memory connected directly with, in close proximity to, or integrated as part of processor 510. Computing device architecture 500 can copy data from memory 515 and/or the storage device 530 to cache 512 for quick access by processor 510. In this way, the cache can provide a performance boost that avoids processor 510 delays while waiting for data. These and other engines can control or be configured to control processor 510 to perform various actions. Other computing device memory 515 may be available for use as well. Memory 515 can include multiple different types of memory with different performance characteristics. Processor 510 can include any general-purpose processor and a hardware or software service, such as service 1 532, service 2 534, and service 3 536 stored in storage device 530, configured to control processor 510 as well as a special-purpose processor where software instructions are incorporated into the processor design. Processor 510 may be a self-contained system, containing multiple cores or processors, a bus, memory controller, cache, etc. A multi-core processor may be symmetric or asymmetric.

To enable user interaction with the computing device architecture 500, input device 545 can represent any number of input mechanisms, such as a microphone for speech, a touch-sensitive screen for gesture or graphical input, key-board, mouse, motion input, speech and so forth. Output device 535 can also be one or more of a number of output mechanisms known to those of skill in the art, such as a display, projector, television, speaker device, etc. In some instances, multimodal computing devices can enable a user to provide multiple types of input to communicate with computing device architecture 500. Communication interface 540) can generally govern and manage the user input and computing device output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof. Storage device 530) can include services 532, 534, 536 for controlling processor 510. Other hardware or software modules or engines are contemplated. Storage device 530 can be connected to the computing device connection 505. In one aspect, a hardware module that performs a particular function can include the software component stored in a computer-readable medium in connection with the necessary hardware components, such as processor 510, connection 505, output device 535, and so forth, to carry out the function.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic array's (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for wireless communications, comprising: at least one memory; and at least one processor coupled to the at least one memory and configured to: receive an unprotected management frame indicative of a disconnection of the apparatus, wherein the unprotected management frame includes an address indicative of an identified wireless access point (AP) associated with the disconnection; determine a transmitter signature associated with the unprotected management frame; determine a difference between the transmitter signature and a corresponding transmitter signature associated with a protected data frame received from the identified wireless AP; and determine, based on the difference being greater than a threshold, the unprotected management frame is not transmitted by the identified wireless AP.

Aspect 2. The apparatus of Aspect 1, wherein the at least one processor is further configured to: drop the unprotected management frame based on determining that the unprotected management frame is not transmitted by the identified wireless AP.

Aspect 3. The apparatus of any of Aspects 1 or 2, wherein the unprotected management frame comprises a deauthentication frame indicative of the identified wireless AP deauthenticating the apparatus.

Aspect 4. The apparatus of Aspect 3, wherein the at least one processor is further configured to: determine, based on the difference being greater than the threshold, that the unprotected management frame is a spoofed deauthentication frame transmitted by a spoofed AP different from the identified wireless AP.

Aspect 5. The apparatus of any of Aspects 1 to 4, wherein the unprotected management frame comprises a disassociation frame indicative of the identified wireless AP disassociating the apparatus.

Aspect 6. The apparatus of any of Aspects 1 to 5, wherein the at least one processor is configured to receive the protected data frame prior to the unprotected management frame, and wherein the protected data frame includes the address indicative of the identified wireless AP.

Aspect 7. The apparatus of Aspect 6, wherein the corresponding transmitter signature is a stored transmitter signature associated with the address indicative of the identified wireless AP.

Aspect 8. The apparatus of any of Aspects 1 to 7, wherein: the transmitter signature comprises a first sequence value associated with receiving the unprotected management frame; and the corresponding transmitter signature comprises a second sequence value associated with a previously received management frame from the identified wireless AP.

Aspect 9. The apparatus of any of Aspects 1 to 8, wherein: the transmitter signature comprises a first received signal strength indicator (RSSI) value associated with receiving the unprotected management frame; and the corresponding transmitter signature comprises a second RSSI value associated with a previously received protected data frame from the identified wireless AP.

Aspect 10. The apparatus of any of Aspects 1 to 9, wherein: the transmitter signature comprises a first angle-of-arrival (AoA) value associated with receiving the unprotected management frame; and the corresponding transmitter signature comprises a second AoA value associated with a previously received protected data frame from the identified wireless AP.

Aspect 11. The apparatus of any of Aspects 1 to 10, wherein: the transmitter signature comprises one or more of a first amplitude and a first phase shift associated with a subcarrier of the unprotected management frame; and the corresponding transmitter signature comprises one or more of a second amplitude and a second phase shift associated with a subcarrier of a previously received protected data frame from the identified wireless AP.

Aspect 12. The apparatus of any of Aspects 1 to 11, wherein the at least one processor is further configured to:

determine a second transmitter signature associated with the unprotected management frame; determine a corresponding second transmitter signature associated with the protected data frame; and determine a second difference between the second transmitter signature and the corresponding second transmitter signature.

Aspect 13. The apparatus of Aspect 12, wherein, to determine the unprotected management frame was not transmitted by the identified wireless AP, the at least one processor is configured to: weight the difference between the transmitter signature and the corresponding transmitter signature using a first weight value; and weight the second difference using a second weight value.

Aspect 14. The apparatus of any of Aspects 1 to 13, wherein the address is a Media Access Control (MAC) address associated with the identified wireless AP.

Aspect 15. A method of wireless communications at a network device, comprising: receiving an unprotected management frame indicative of a disconnection of the network device, wherein the unprotected management frame includes an address indicative of an identified wireless access point (AP) associated with the disconnection; determining a transmitter signature associated with the unprotected management frame; determining a difference between the transmitter signature and a corresponding transmitter signature associated with a protected data frame received from the identified wireless AP; and determining, based on the difference being greater than a threshold, the unprotected management frame is not transmitted by the identified wireless AP.

Aspect 16. The method of Aspect 15, further comprising: dropping the unprotected management frame based on determining that the unprotected management frame is not transmitted by the identified wireless AP.

Aspect 17. The method of any of Aspects 15 or 16, wherein the unprotected management frame comprises a deauthentication frame indicative of the identified wireless AP deauthenticating the network device.

Aspect 18. The method of Aspect 17, further comprising: determining, based on the difference being greater than the threshold, that the unprotected management frame is a spoofed deauthentication frame transmitted by a spoofed AP different from the identified wireless AP.

Aspect 19. The method of any of Aspects 15 to 18, wherein the unprotected management frame comprises a disassociation frame indicative of the identified wireless AP disassociating the network device.

Aspect 20. The method of any of Aspects 15 to 19, wherein the protected data frame is received prior to the unprotected management frame and includes the address indicative of the identified wireless AP.

Aspect 21. The method of Aspect 20, wherein the corresponding transmitter signature is a stored transmitter signature associated with the address indicative of the identified wireless AP.

Aspect 22. The method of any of Aspects 15 to 21, wherein: the transmitter signature comprises a first sequence value associated with receiving the unprotected management frame; and the corresponding transmitter signature comprises a second sequence value associated with a previously received management frame from the identified wireless AP.

Aspect 23. The method of any of Aspects 15 to 22, wherein: the transmitter signature comprises a first received signal strength indicator (RSSI) value associated with receiving the unprotected management frame; and the corresponding transmitter signature comprises a second RSSI value associated with a previously received protected data frame from the identified wireless AP.

Aspect 24. The method of any of Aspects 15 to 23, wherein: the transmitter signature comprises a first angle-of-arrival (AoA) value associated with receiving the unprotected management frame; and the corresponding transmitter signature comprises a second AoA value associated with a previously received protected data frame from the identified wireless AP.

Aspect 25. The method of any of Aspects 15 to 24, wherein: the transmitter signature comprises one or more of a first amplitude and a first phase shift associated with a subcarrier of the unprotected management frame; and the corresponding transmitter signature comprises one or more of a second amplitude and a second phase shift associated with a subcarrier of a previously received protected data frame from the identified wireless AP.

Aspect 26. The method of any of Aspects 15 to 25, further comprising: determining a second transmitter signature associated with the unprotected management frame; determining a corresponding second transmitter signature associated with the protected data frame; and determining a second difference between the second transmitter signature and the corresponding second transmitter signature.

Aspect 27. The method of Aspect 26, wherein determining the unprotected management frame was not transmitted by the identified wireless AP comprises: weighting the difference between the transmitter signature and the corresponding transmitter signature using a first weight value; and weighting the second difference using a second weight value.

Aspect 28. The method of any of Aspects 15 to 27, wherein the address is a Media Access Control (MAC) address associated with the identified wireless AP.

Aspect 29. A non-transitory computer-readable storage medium having stored thereon instructions which, when executed by one or more processors, cause the one or more processors to perform any of the operations of any of Aspects 15 to 28.

Aspect 30. An apparatus comprising one or more means for performing operations according to any of Aspects 15 to 28.

What is claimed is:

1. An apparatus for wireless communications, comprising:

at least one memory; and at least one processor coupled to the at least one memory and configured to:

receive, by the apparatus, a protected Wi-Fi data frame including an address indicative of an identified wireless access point (AP), wherein data of the protected Wi-Fi data frame is encrypted with a cryptographic transmission key;

determine, based on successful decryption of the protected Wi-Fi data frame using a stored transmission key obtained in a previous key exchange between the apparatus and the identified wireless AP, that the identified wireless AP is a genuine AP having the address, wherein the stored transmission key is the cryptographic transmission key;

based on the determination the identified wireless AP is a genuine AP, generate a stored transmitter signature indicative of physical transmission characteristics measured by the apparatus for the protected Wi-Fi data frame, wherein the stored transmitter signature is associated to the identified wireless AP within the at least one memory;

receive, by the apparatus, an unprotected management frame indicative of a disconnection of the apparatus, wherein a source address of the unprotected management frame is the address indicative of the identified wireless AP, and wherein the apparatus is an associated client connected to the identified wireless AP;

determine a transmitter signature for the unprotected management frame, the transmitter signature determined based on one or more physical transmission characteristics measured by the apparatus for the unprotected management frame;

determine a difference between the transmitter signature for the unprotected management frame and the stored transmitter signature associated to the identified wireless AP;

determine, based on the difference being greater than a threshold, the unprotected management frame is not transmitted by the identified wireless AP; and drop the unprotected management frame based on the determination that the unprotected management frame is not transmitted by the identified wireless AP.

2. The apparatus of claim 1, wherein the unprotected management frame comprises a deauthentication frame indicative of the identified wireless AP deauthenticating the apparatus.

3. The apparatus of claim 2, wherein the at least one processor is further configured to:

determine, based on the difference being greater than the threshold, that the unprotected management frame is a spoofed deauthentication frame transmitted by a spoofed AP different from the identified wireless AP.

4. The apparatus of claim 1, wherein the unprotected management frame comprises a disassociation frame indicative of the identified wireless AP disassociating the apparatus.

5. The apparatus of claim 1, wherein the at least one processor is configured to receive the protected Wi-Fi data frame and generate the stored transmitter signature prior to receipt of the unprotected management frame.

6. The apparatus of claim 5, wherein the stored transmitter signature is associated to the identified wireless AP and the address, wherein the address is a source media access control (MAC) address for the genuine AP.

7. The apparatus of claim 1, wherein:

the transmitter signature for the unprotected management frame comprises a first sequence value associated with receiving the unprotected management frame; and the stored transmitter signature comprises a second sequence value associated with the protected Wi-Fi data frame, wherein the protected Wi-Fi data frame is a previously received frame received from the identified wireless AP prior to the unprotected management frame.

8. The apparatus of claim 1, wherein:

the transmitter signature for the unprotected management frame comprises a first received signal strength indicator (RSSI) value associated with receiving the unprotected management frame; and the stored transmitter signature comprises a second RSSI value associated with the protected Wi-Fi data frame, wherein the protected Wi-Fi data frame is a previously received frame received from the identified wireless AP prior to the unprotected management frame.

9. The apparatus of claim 1, wherein:

the transmitter signature for the unprotected management frame comprises a first angle-of-arrival (AoA) value associated with receiving the unprotected management frame; and the stored transmitter signature comprises a second AoA value associated with the protected Wi-Fi data frame, wherein the protected Wi-Fi data frame is a previously received frame received from the identified wireless AP prior to the unprotected management frame.

10. The apparatus of claim 1, wherein:

the transmitter signature for the unprotected management frame comprises one or more of a first amplitude and a first phase shift associated with a subcarrier of the unprotected management frame; and the stored transmitter signature comprises one or more of a second amplitude and a second phase shift associated with a subcarrier of the protected Wi-Fi data frame, wherein the protected Wi-Fi data frame is a previously received frame received from the identified wireless AP prior to the unprotected management frame.

11. The apparatus of claim 1, wherein the at least one processor is further configured to:

determine a second transmitter signature associated with the unprotected management frame;

generate a second stored transmitter signature indicative of physical transmission characteristics measured for the protected Wi-Fi data frame different from the physical transmission characteristics measured for the protected Wi-Fi data frame and indicated by the stored transmitter signature, the second stored transmitter signature indicative of; and determine a second difference between the second transmitter signature associated with the unprotected management frame and the second stored transmitter signature.

12. The apparatus of claim 11, wherein, to determine the unprotected management frame was not transmitted by the identified wireless AP, the at least one processor is configured to:

weight the difference between the transmitter signature and the stored transmitter signature using a first weight value; and weight the second difference between the second transmitter signature and the second stored transmitter signature using a second weight value.

13. The apparatus of claim 1, wherein the address is a Media Access Control (MAC) address associated with the identified wireless AP.

14. A method of wireless communications at a network device, comprising:

receiving, by the network device, a protected Wi-Fi data frame including an address indicative of an identified wireless access point (AP), wherein data of the protected Wi-Fi data frame is encrypted with a cryptographic transmission key;

determining, based on successful decryption of the protected Wi-Fi data frame using a stored transmission key obtained in a previous key exchange between the network device and the identified wireless AP, that the identified wireless AP is a genuine AP having the address, wherein the stored transmission key is the cryptographic transmission key;

based on the determination the identified wireless AP is a genuine AP, generating a stored transmitter signature indicative of physical transmission characteristics measured by the network device for the protected Wi-Fi data frame, wherein the stored transmitter signature is associated to the identified wireless AP within at least one memory of the network device;

receiving, by the network device, an unprotected management frame indicative of a disconnection of the network device, wherein a source address of the unprotected management frame is the address indicative of the identified wireless AP, and wherein the network device is an associated client connected to the identified wireless AP;

determining a transmitter signature for the unprotected management frame, the transmitter signature determined based on one or more physical transmission characteristics measured by the network device for the unprotected management frame;

determining a difference between the transmitter signature for the unprotected management frame and the stored transmitter signature associated to the identified wireless AP;

determining, based on the difference being greater than a threshold, the unprotected management frame is not transmitted by the identified wireless AP; and dropping the unprotected management frame based on determining that the unprotected management frame is not transmitted by the identified wireless AP.

15. The method of claim 14, wherein the unprotected management frame comprises a deauthentication frame indicative of the identified wireless AP deauthenticating the network device.

16. The method of claim 15, further comprising:

determining, based on the difference being greater than the threshold, that the unprotected management frame is a spoofed deauthentication frame transmitted by a spoofed AP different from the identified wireless AP.

17. The method of claim 14, wherein the unprotected management frame comprises a disassociation frame indicative of the identified wireless AP disassociating the network device.

18. The method of claim 14, wherein the protected Wi-Fi data frame is received and the stored transmitter signature is generated prior to receipt of the unprotected management frame.

19. The method of claim 18, wherein the stored transmitter signature is associated to the identified wireless AP and the address, wherein the address is a source media access control (MAC) address for the genuine AP.

20. The method of claim 14, wherein:

the transmitter signature for the unprotected management frame comprises a first sequence value associated with receiving the unprotected management frame; and the stored transmitter signature comprises a second sequence value associated with the protected Wi-Fi data frame, wherein the protected Wi-Fi data frame is a previously received frame received from the identified wireless AP prior to the unprotected management frame.

21. The method of claim 14, wherein:

the transmitter signature for the unprotected management frame comprises a first received signal strength indicator (RSSI) value associated with receiving the unprotected management frame; and the stored transmitter signature comprises a second RSSI value associated with the protected Wi-Fi data frame, wherein the protected Wi-Fi data frame is a previously received frame received from the identified wireless AP prior to the unprotected management frame.

22. The method of claim 14, wherein:

the transmitter signature for the unprotected management frame comprises a first angle-of-arrival (AoA) value associated with receiving the unprotected management frame; and the stored transmitter signature comprises a second AoA value associated with the protected Wi-Fi data frame, wherein the protected Wi-Fi data frame is a previously received frame received from the identified wireless AP prior to the unprotected management frame.

23. The method of claim 14, wherein:

the transmitter signature for the unprotected management frame comprises one or more of a first amplitude and a first phase shift associated with a subcarrier of the unprotected management frame; and the stored transmitter signature comprises one or more of a second amplitude and a second phase shift associated with a subcarrier of the protected Wi-Fi data frame, wherein the protected Wi-Fi data frame is a previously received frame received from the identified wireless AP prior to the unprotected management frame.

24. The method of claim 14, further comprising:

determining a second transmitter signature associated with the unprotected management frame;

generating a second stored transmitter signature indicative of physical transmission characteristics measured for the protected Wi-Fi data frame different from the physical transmission characteristics measured for the protected Wi-Fi data frame and indicated by the stored transmitter signature, the second stored transmitter signature indicative of; and determining a second difference between the second transmitter signature associated with the unprotected management frame and the second stored transmitter signature.

25. The method of claim 24, wherein determining the unprotected management frame was not transmitted by the identified wireless AP comprises:

weighting the difference between the transmitter signature and the corresponding transmitter signature using a first weight value; and weighting the second difference between the second transmitter signature and the second stored transmitter signature using a second weight value.

26. The method of claim 14, wherein the address is a Media Access Control (MAC) address associated with the identified wireless AP.

* * * * *